(12) United States Patent
Kaltenbach et al.

(10) Patent No.: US 8,911,315 B2
(45) Date of Patent: Dec. 16, 2014

(54) HYBRID DRIVE OF A MOTOR VEHICLE

(75) Inventors: Johannes Kaltenbach, Friedrichshafen (DE); Uwe Griesmeier, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/002,791

(22) PCT Filed: Feb. 1, 2012

(86) PCT No.: PCT/EP2012/051631
§ 371 (c)(1),
(2), (4) Date: Sep. 3, 2013

(87) PCT Pub. No.: WO2012/123170
PCT Pub. Date: Sep. 20, 2012

(65) Prior Publication Data
US 2013/0345010 A1    Dec. 26, 2013

(30) Foreign Application Priority Data

Mar. 15, 2011    (DE) .......................... 10 2011 005 531

(51) Int. Cl.
*F16H 3/72*     (2006.01)
*F16H 37/06*    (2006.01)
(Continued)

(52) U.S. Cl.
CPC .............. *F16H 37/065* (2013.01); *B60K 6/365* (2013.01); *B60K 6/387* (2013.01);
(Continued)

(58) Field of Classification Search
CPC ...... B60K 6/365; F16H 2200/021; F16H 3/72
USPC ........................................................ 475/1–10
See application file for complete search history.

(56) References Cited

U.S. PATENT DOCUMENTS 5,911,642 A    6/1999   Andres et al.
6,248,036 B1   6/2001   Masaki
(Continued)

FOREIGN PATENT DOCUMENTS

DE    199 34 696 A1   5/2001
DE    699 28 846 T2   8/2006
(Continued)

OTHER PUBLICATIONS

German Search Report Corresponding to 10 2011 005 531.2 mailed Feb. 6, 2012.
(Continued)

*Primary Examiner* — Tisha Lewis
(74) *Attorney, Agent, or Firm* — Davis & Bujold, PLLC; Michael J. Bujold

(57) ABSTRACT

A hybrid drive of a motor vehicle comprising a combustion engine having a drive shaft, at least one electric machine, a manual transmission having input shafts (GE1, GE2) and an output shaft. Shaft (GE1) couples the combustion engine drive shaft and the electric machine can drive shaft (GE2). For efficient driving with the combustion engine and/or electric machine optionally decoupled or coupled, and for a reduction of size, shafts (GE1, GE2) are coaxially located one after the other, the output shaft coaxially surrounds one of the shafts (GE1, GE2) and planetary gearsets are disposed coaxially behind one another, each having an input and output element. The combustion engine can be coupled alternately to shaft (GE2), via a first shift element or to the input element of the first planetary gearset, via a second shift element. The output elements of the planetary gearsets are connected to the output shaft.

11 Claims, 6 Drawing Sheets

(51) Int. Cl.
    *B60K 6/365* (2007.10)
    *B60K 6/387* (2007.10)
    *B60K 6/48* (2007.10)
    *B60K 6/547* (2007.10)
    *B60K 6/54* (2007.10)
    *F16H 3/62* (2006.01)

(52) U.S. Cl.
    CPC ............... *B60K 6/48* (2013.01); *B60K 6/547* (2013.01); *B60K 2006/4816* (2013.01); *B60K 2006/4841* (2013.01); *B60K 2006/541* (2013.01); *F16H 3/62* (2013.01); *F16H 3/725* (2013.01); *F16H 2200/2007* (2013.01); *F16H 2200/201* (2013.01); *F16H 2200/2064* (2013.01); *F16H 2200/2097* (2013.01); *Y02T 10/6221* (2013.01); *Y02T 10/6256* (2013.01)
    USPC .................................................. 475/5; 475/4

(56) References Cited

U.S. PATENT DOCUMENTS

| | | | |
|---|---|---|---|
| 6,490,945 B2 * | 12/2002 | Bowen | 74/339 |
| 6,540,631 B2 * | 4/2003 | Holmes | 475/5 |
| 6,592,484 B1 | 7/2003 | Tsai et al. | |
| 6,805,648 B1 | 10/2004 | Ehrlinger | |
| 7,137,919 B2 * | 11/2006 | Holmes | 475/5 |
| 7,314,421 B2 | 1/2008 | Kim | |
| 7,594,869 B2 * | 9/2009 | Holmes | 475/5 |
| 2006/0154772 A1 | 7/2006 | Schmidt et al. | |
| 2009/0098969 A1 | 4/2009 | Tabata et al. | |
| 2009/0186735 A1 | 7/2009 | Iwanaka et al. | |
| 2013/0186233 A1 | 7/2013 | Kaltenbach | |

FOREIGN PATENT DOCUMENTS

| | | |
|---|---|---|
| DE | 10 2005 057 930 A1 | 2/2007 |
| DE | 10 2009 024 625 A1 | 12/2010 |
| DE | 10 2010 030 567 A1 | 12/2011 |
| DE | 10 2010 030 573 A1 | 12/2011 |

OTHER PUBLICATIONS

International Search Report Corresponding to PCT/EP2012/051631 mailed Mar. 26, 2012.

Written Opinion Corresponding to PCT/EP2012/051631 mailed Mar. 26, 2012.

* cited by examiner

| Type of drive | VM | i_VM | S1 | S2 | EM | i_EM |
|---|---|---|---|---|---|---|
| VM and EM decoupled | -- | -- | N | N | -- | -- |
| Charging in neutral | -- | -- | A | N | -- | -- |
| E travel 1st gear (VM decoupled) | -- | -- | N | C | G1 | 2,6 |
| E travel 3rd gear (VM decoupled) | -- | -- | N | D | G3 | 1,0 |
| V+E travel 1st gear | G1 | 2,6 | A | C | G1 | 2,6 |
| V+E travel 2nd gear (only VM shifted) | G2 | 1,6 | B | C | G1 | 2,6 |
| V travel 2nd gear (EM decoupled) | G2 | 1,6 | B | N | -- | -- |
| V+E travel 2nd gear (only EM shifted) | G2 | 1,6 | B | D | G3 | 1,0 |
| V+E travel 3rd gear | G3 | 1,0 | A | D | G3 | 1,0 |

Fig. 1a

HYBRID DRIVE OF A MOTOR VEHICLE

This application is a National Stage completion of PCT/EP2012/051631 filed Feb. 1, 2012, which claims priority from German patent application serial no. 10 2011 005 531.2 filed Mar. 15, 2011.

FIELD OF THE INVENTION

The invention relates to a hybrid drive of a motor vehicle.

BACKGROUND OF THE INVENTION

Hybrid drives with internal combustion engine and electric motor drive sources contribute to the reduction of fuel consumption and polluting emissions in automobile traffic. In order to obtain the most effective and efficient operation of a hybrid drive, drive strategies are used that can flexibly utilize the electric machine of the hybrid drive depending on the situation. The electric machine is to be used as the sole drive source in the case of startup for example, in city short-haul traffic, or in stop-and-go operation, as an additional drive source in the case of increased power demands in a boost operation, as a starter generator for fast starts of the internal combustion engine and as a generator for generating electrical current, or for energy recovery in a recuperation operation. In contrast, the internal combustion engine is to be operated at least predominantly at operating points that are favorable for consumption, torque and speed with high efficiency.

In vehicle drive trains, hybrid drive arrangements are frequently combined with automated vehicle transmissions for forming drive transmission ratios. In doing so, hybrid drives, with which the electric drive and the internal combustion engine can be coupled to the drive train independently of each other, at least for individual transmission ratio steps, have advantages due to more flexible control thereof in comparison to arrangements with which the electric drive is permanently connected to the drive at the transmission input or at the transmission drive, that is, in the power flow of the drive train. With such hybrid drives, during shift procedures with the internal combustion engine, that is, gear changes while the internal combustion engine serves a drive source of the vehicle, the tractive force can be largely maintained with the aid of the electric drive. Conversely, during gear changes of the electric drive, the tractive force can be maintained with the aid of the internal combustion engine, insofar as the internal combustion engine is not currently switched off.

The shift procedures can be synchronized using the internal combustion engine and a friction engaged clutch acting between the internal combustion engine and the transmission input, and/or using the electric drive, so that synchronization devices can be replaced, at least to some extent, by more cost effective claw clutches. The shifting points with electric shifts, thus shifts occurring during the electric motor drive, can be basically very variably selectable due to the typically greater speed range available, with good efficiency compared to the internal combustion engine. Additionally, the attainable shifting times allow the use of a relatively inexpensive shift actuating system. Because an electric machine can basically be operated in both directions of rotation, by using a controllable reversal of the direction of rotation, it is possible to eliminate a separate reverse gear set. Additionally, the step changes of the internal combustion engine gears in such a hybrid drive system can be selected to be relatively large, whereby a relatively small number of gears can be used for implementing a specified overall gear ratio spread.

Such drive concepts have already been proposed for vehicles with which the electric drive is designed so that the electric drive alone has sufficient driving performance at least for a short-haul operation, in city traffic for example. These are so-called plug-in hybrid vehicles or range extender electric vehicles, with which an electric energy store is additionally externally chargeable and/or the internal combustion engine serves mainly for increasing the range and for generating energy for the electric drive.

Such hybrid drives with a manual transmission, which has two input shafts and a common output shaft, are known, wherein the output shaft is disposed in countershaft design and axis parallel to the input shafts. The one input shaft can be driven via an internal combustion engine, and the other input shaft can be driven via an electric machine. Both input shafts can be shifted, via gear sets coupled to the output shaft, and can be combined in a drive connection.

The unpublished document DE 10 2010 030 567 A1 describes such a hybrid drive with which two input shafts are disposed coaxially and axially adjacent to each other, and a common output shaft is disposed axis parallel to the input shafts. One of the two input shafts is separated into an axially outer and an axially inner shaft section. The outer shaft section is drive connected, or can be, drive connected to an associated internal combustion engine or to an associated electric machine. The inner shaft section supports gear sets assigned to the drive gears. Additionally, a superposition transmission is preferably provided as a planetary gear set having a sun gear and a ring gear as an input elements and a planet carrier as an output element. The input elements are each connected in a rotationally fixed manner to one of the two shaft sections. The output element is connected, or can be connected, in a rotationally fixed manner to the drive gear of an assigned startup gear set. A lock-up clutch, by means of which the superposition transmission can be locked, is disposed between the planet carrier and the ring gear.

This hybrid drive, in the case of an active superposition transmission, with an internal combustion engine drive that is running and connected to the respective input shaft, with the input shafts coupled together and an engaged start-up gear wheel set under the control of the electric machine from generator operation into motor operation, allows a wear-free startup with high tractive force, whereby a conventional friction clutch is not necessary as a start-up element. This function corresponds to the start-up function of comparable known electro-dynamic start-up elements, as described for example in the document DE 199 34 696 A1. This document shows one such wear-free electro-dynamic start-up element, with which a planetary gear set is disposed between the internal combustion engine and the transmission input, wherein a planet carrier is connected to a manual transmission, a ring gear is connected to the internal combustion engine, and a sun gear is connected to an electric machine. On the other hand, a hybrid drive according to the document DE 10 2010 030 567 A1 can be operated with an engaged lock-up clutch such as a hybrid drive with two input shafts and one common output shaft without a superposition transmission. A suitable basic hybrid drive with a three speed manual transmission with spur gears in countershaft design, with which two pure electric motor drive gears and three internal combustion engine drive gears and a boost operation, a recuperation operation and a charge operation can be selected, is also described in this unpublished document.

The document DE 10 2010 030 573 A1, also unpublished, also shows a comparable basic hybrid drive. Two input shafts are disposed coaxially over one another in sections, wherein the one input shaft assigned to the internal combustion engine is the inner shaft, and the shaft assigned to the electric machine is the outer shaft. A common output shaft is disposed axis parallel to the input shafts. A second electric machine is disposed on the input shaft assigned to the internal combustion engine. A friction clutch, by means of which the drive shaft of the internal combustion engine which could be connected, switchable to the respective transmission input shaft, is eliminated.

SUMMARY OF THE INVENTION

Based on this background, the problem addressed by the invention is to provide a hybrid drive of the initially named type, which allows efficient driving operation with the internal combustion engine selectively coupled or decoupled, or with the electric machine selectively coupled or decoupled, and which has a compact design, particularly with respect to the radial dimensions.

The problem is solved by the shift logic and functionality of a typical range extender transmission designed in spur gear design, or the like, for a hybrid drive train that can also be implemented in planetary design saving construction space.

Accordingly the invention is based on a hybrid drive of a motor vehicle that has an internal combustion engine having a drive shaft, at least one electric machine having a rotor and a manual transmission having two input shafts and a common output shaft, wherein the first input shaft is or can be connected to the drive shaft of the internal combustion engine, and the second input shaft can be directly or indirectly driven by the rotor of the electric machine.

For solving the problem, the invention provides that the two input shafts are disposed coaxially behind one another, that the output shaft is disposed coaxially above one of the two input shafts, and that at least two planetary gear sets, each having at least one input element and one output element, are disposed coaxially behind one another, wherein the internal combustion engine can be alternately coupled, via a first shift element, to the second input shaft, or, via a second shift element, to the input element of the first planetary gear set, and wherein the output elements of the two planetary gear sets are connected to the output shaft.

This hybrid drive train in planetary design with two planetary gear sets has the same functionality as the initially described hybrid drive. However a more compact radial design is attained by eliminating the gear set in the spur gear design. This is particularly advantageous for vehicles in which the drive assemblies are installed front-transverse to the vehicle longitudinal axis.

With one embodiment, the two planetary gear sets and the output shaft are disposed above the second input shaft, wherein the first planetary gear set comprises a ring gear as an input element, a fixed sun gear, and a planet carrier, having a plurality of planet gears meshing between the sun gear and the ring gear, as an output element, wherein the second planetary gear set comprises a sun gear as an input element, a ring gear that can be fixed via a third shift element, and a planet carrier, having a plurality of planet gears meshing between the sun gear and the ring gear, as an output element, and with which the second planetary gear set can be locked by means of a fourth shift element.

This arrangement represents a three speed manual transmission which, due to variable control and coupling of the two drive assemblies, via the planetary gear sets, to the output shaft and the two input shaft among themselves, enables the use of two drive gears that are driven solely by the electric motor, wherein the internal combustion engine is decoupled from the drive train, three internal combustion engine drive gears are facilitated, wherein the electric machine is coupled to the drive train, and facilitates a drive gear driven solely by the internal combustion engine, wherein the electric machine is decoupled from the drive train.

The shift logic of the transmission according to the invention corresponds to the shift logic of a comparable transmission in spur gear design having at least three gear set planes. The shifts of the internal combustion engine drive gears can occur with the tractive force bridged by the electric motor. It is also fundamentally possible to bridge the tractive force of the shifts of the electric motor drive gears using the internal combustion engine. Additionally, a charge operation for charging an electric energy store is possible using the electric motor in a neutral position of the transmission. A reverse gear, driven by the electric motor, can be implemented by reversing the direction of rotation of the electric drive in a startup gear so that transmission components for a separate reverse gear can be eliminated.

It can be further provided that the two planetary gear sets have the same transmission ratio. With the use of the two planetary gear sets having the same transmission ratio, additional cost savings can be attained by using the same components.

The output shaft can be in drive connection, via an output gear set, with an axle differential of a vehicle axle, which is positioned axially between the two planetary gear sets, or axially in front of, or behind, the planetary gear set. Due to the variable arrangement of the output gear set, the drive can be adapted relatively easily to the installation space conditions of a vehicle.

The output gear set can be designed as a simple spur gear pair, or as a two-stage output with a drive gear that is connected to the output shaft in a rotationally fixed manner, with an output gear that is in drive connection with the axle differential, and with an intermediate gear, mounted on an intermediate shaft, which is in gear engagement with the drive gear and the output gear. Thereby, a change in the direction of rotation can be implemented for the output in order to obtain the usual direction of rotation, particularly with a front-transverse installation. Thus, rotation of the drive is not necessary. In order to save as much space as possible with the installation of the intermediate shaft, it can be positioned in a free space axially between the two planetary gear sets. It is also possible to design the intermediate gear as a double gear having two gears of different sizes connected together in a rotationally fixed manner, wherein one of the gears is in engagement with the drive gear and the other is in engagement with the output gear, in order to keep the radial extension of the output gear set with the reversal of the change of direction as low as possible.

For further savings of component costs, installation space and weight, it can be provided that the first and second shift elements and the third and fourth shifts elements are each combined as shift packets that can be actuated on both sides. The shift packets can be designed as inexpensive claw clutches, because synchronizing the gears with shift procedures can be performed by regulating the speed of the electric drive, or the internal combustion engine.

Additionally, it can be provided, as an alternative to a direct connection of the rotor to the electric machine at the respective input shaft, that the rotor is in drive connection, via an input gear set, with the second input shaft. The input gear set can be designed as a simple spur gear pair which results in a constant input transmission ratio of the electric drive. Thereby the rotational speed level of the electric machine can be increased or decreased in the electric drive gears. For example, with a higher level of rotational speed an electric machine can be used that is less expensive and has comparatively weaker torque.

Using the input gear set, the electric machine can be attached laterally at the drive train. Such a lateral attachment of the electric machine, above the planetary gear set, allows a reduction in the axial construction length of the drive train, if appropriate construction space is available for the electric machine in the radial extension.

The first input shaft can be connected to the drive shaft of the internal combustion engine in a conventional manner, shiftable via a controllable friction engaged clutch. The friction engaged clutch can be used as a separation and start-up clutch and as a synchronization means with shift procedures. If, in contrast, the electric machine is used as a start-up element, the friction engaged clutch can, in principle, be omitted and the internal combustion engine can respectively be coupled to the drive train, or decoupled from the drive train, via one or more of the provided shift elements.

It is also possible that a second electric machine is provided, the rotor of which is, or can be, in drive connection with the drive shaft of the internal combustion engine. The second electric machine can be operated as a motor and generator, as well as being implemented as a crankshaft starter generator of the internal combustion engine. Thus, the second electric machine is implemented so that, as a generator, it can generate a required mean electrical power for supplying the first electric machine as a traction machine for maintaining extended stop-and-go operation. A series hybrid operation of the drive train results that is available in a load speed range and is particularly favorable with respect to emissions.

An alternative to an embodiment with a friction engaged clutch as a startup and separation clutch, and possibly a second electric machine drive connected to the internal combustion engine, it can be provided that a third planetary gear set is disposed between the second planetary gear set and the electric machine, and comprises a sun gear as an input element, a ring gear, and a planet carrier having a plurality of planet gears meshing between the sun gear and the ring gear as an output element, wherein the second input shaft has an axially inner shaft section and an axially outer shaft section, wherein the input element of the third planetary gear set is drive connected, via the outer shaft section of the second input shaft, to the rotor of the electric machine, wherein the ring gear is connected in a rotationally fixed manner to the inner shaft section of the second input shaft, and wherein the output element is connected in a rotationally fixed manner, via a hollow shaft, to the input element of the second planetary gear set, and in that the third planetary gear set can be blocked via a fifth shift element.

Due to the arrangement of the additional planetary gear set, wear-free startup control can be implemented without a clutch, as is known for example as an electrodynamic start-up element from the initially cited document DE 199 34 696 A1. Thereby, particularly even in the case of an empty electrical energy store and without a friction engaged clutch, a comfortable startup can be ensured in a start-up gear, in that the internal combustion engine and the electric machine are used in a speed-superposition operation with the electric machine initially running as a generator.

With the arrangement having an additional third planetary gear set, additionally a separate starter device can be provided for the internal combustion engine, in order to start the internal combustion engine in an easy and speed-favorable manner without additional rotating masses of this planetary gear set.

BRIEF DESCRIPTION OF THE DRAWINGS

For illustrating the invention, the description is accompanied by drawings with exemplary embodiments. They show.

DETAILED DESCRIPTION OF THE PREFERRED EMBODIMENTS

Figure 1:
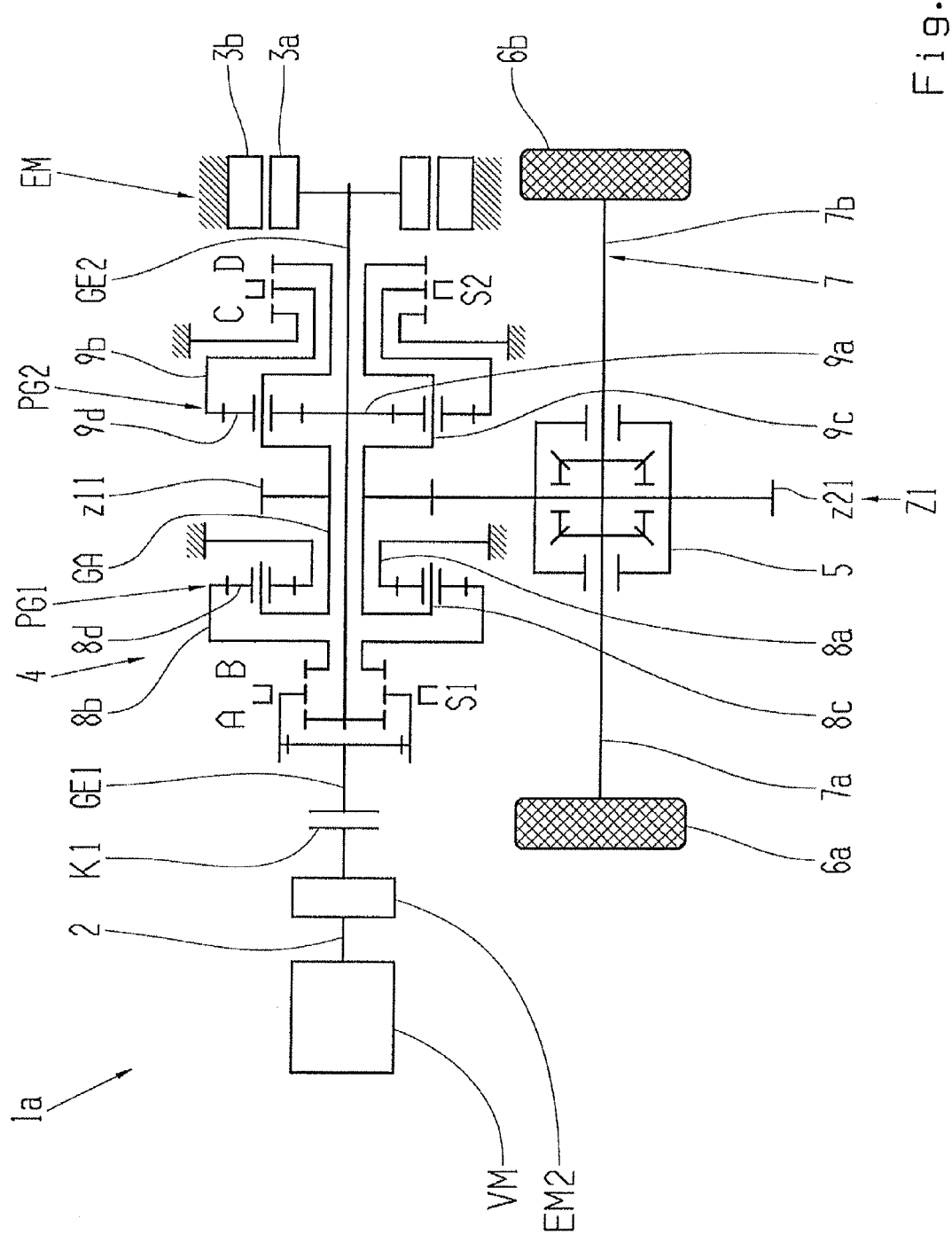
FIG. 1 a first embodiment of the hybrid drive according to the invention in a schematic representation, FIG. 1a a shift pattern with operating modes and example transmission ratio of the hybrid drive according to FIG. 1 in a tabular representation, FIG. 2 a second embodiment of the hybrid drive according to the invention in a schematic representation, FIG. 3 a third embodiment of the hybrid drive according to the invention in a schematic representation, FIG. 4 a fourth embodiment of the hybrid drive according to the invention in a schematic representation, and FIG. 5 a fifth embodiment of the hybrid drive according to the invention in a schematic representation.

Accordingly, a hybrid drive 1a of a motor vehicle, preferably designed as a range extender drive, comprises an internal combustion engine VM having a drive shaft 2, an electric machine EM that can be operated as a motor and generator having a rotor 3a and a stator 3b, and an optional second electric machine EM2, and a manual transmission 4 having two planetary gear sets PG1, PG2. The manual transmission 4 has two input shafts GE1, GE2 disposed coaxially one behind the other, and a common output shaft GA designed as a hollow shaft, wherein the latter is disposed coaxially about the longer, second input shaft GE2. The second electric machine EM2 is in drive connection with the drive shaft 2 of the internal combustion engine VM. The first input shaft GE1 can be connected radially, via an optional controllable friction clutch K1 and the second electric machine EM2, to the drive shaft 2 of the internal combustion engine VM. The second input shaft GE2 is connected in a rotationally fixed manner to the rotor 3a of the electric machine EM.

The first planetary gear set PG1 comprises a central sun gear 8a, which is disposed radially about the output shaft GA and is fixed or firmly braked at a machine part, a radially outer ring gear 8b, which is disposed rotatably on the second input shaft GE2, and a planet carrier 8c, which is connected in a rotationally fixed manner to the output shaft GA. The planet carrier 8c supports a plurality of planet gears 8d, which are in engagement with the sun gear 8a and the ring gear 8b. The planet carrier 8c serves an output element or output drive element of the planetary gear set PG1. The ring gear 8b serves as an input element, or drive gear. It can be connected in a rotationally fixed manner, via a second shift element B, to the first input shaft GE1. The two input shafts GE1 and GE2 can be combined together via a first shift element A, wherein the two shift elements A and B are designed as claw clutches, which can be engaged and disengaged, and are combined in a shift packet S1.

The second planetary gear set PG2 comprises a central sun gear 9a, which is connected in a rotationally fixed manner to the second input shaft GE2 and serves as an input element, or drive gear, an outer ring gear 9b, and a planet carrier 9c, which is connected in a rotationally fixed manner to the output shaft GA and serves as an output element, or output driven element. The planet carrier 9c supports a plurality of planetary gears 9d, which are in engagement with the sun gear 9a and the ring gear 9b. The planet carrier 9c and the ring gear 9b are connected, via hollow shaft sections, to a second shift packet S2, which has a third shift element C and a fourth shift element D, which are designed as claw clutches that can be engaged and disengaged. The ring gear 9b can be fixed, or braked, to a machine part, via the third shift element C. The ring gear 9b can be coupled to the planet carrier 9c, via the fourth shift element D, whereby the planetary gear set PG2 can be bridged, or locked.

The common output shaft GA is in drive connection with the axle differential 5, via an output gear set Z1. The output gear set Z1 comprises a drive gear z11 that is connected in a rotationally fixed manner to the output shaft GA and that is in engagement with an output gear z21, which interacts with the axle differential 5. Two axle shafts 7a, 7b of a vehicle axle 7, which are each connected to a vehicle wheel 6a, 6b, are driven via the axle differential 5.

According to the table in FIG. 1a, for the purely electric driving operation, the hybrid drive has two forward gears G1 and G3; for the internal combustion engine driving operation with optional boost operation and recuperation operation, it has three forward gears G1, G2 and G3; and for the purely internal combustion engine driving operation, it has one forward gear G2. In the table, as an example, a transmission ratio of i0_PG1, 2=−1.6 is assumed for both the first planetary gear set PG1 as well as for the second planetary gear set PG2. The given drive transmission ratios i_EM or i_VM result depending on the mode of operation. The output transmission ratio of the output gear set Z1 is not taken into consideration in the table. The engaged shift elements A, B, C, D of the shift packets S1, S2 or the neutral position thereof, are specified for the represented modes of operation.

If both shift packets S1, S2 are in neutral N, thus both the internal combustion engine VM and also the electric machine EM are decoupled, then the vehicle axle 7 is completely separated from the drive. In the case of the engaged shift element A, the two input shafts GE1, GE2 are coupled together. This can be used as a neutral charging operation when the second shift packet S2 is in the neutral position. In this charging operation, an electric energy store connected to the electric machine EM can be charged, with vehicle standstill, by the running internal combustion engine VM, in the generator operation of the electric machine EM. As an alternative to this, when only the shift position A is engaged, the internal combustion engine VM is started using the electric machine EM.

The second planetary gear set PG2, with the engaged shift element C, generates the first gear G1, via the sun gear 9a as a drive and the planetary carrier 9c as output. The electric machine EM can use this drive gear as a first pure electric motor drive gear. In the shift position D, that is, with the engaged shift element D, the second planetary gear set PG2 is bridged. As a result, a third gear G3 can be used with a direct drive transmission ratio. The electric machine EM can use this gear G3 as a second purely electric motor drive gear. In the case of the two electric motor drive gears, the internal combustion engine VM can be decoupled from the drive. By operating the electric machine EM in the reverse direction of rotation, the first gear G1 can be used as a reverse gear.

When the electric machine EM is used as a start-up element, the friction clutch K1 can be eliminated and the coupling and decoupling of the internal combustion engine VM occurs using the shift elements A or B of the first shift packet S1.

During electric driving with the electric machine EM via the second planetary gear set PG2 and the first or third gear G1 or G3, the first planetary gear set PG1 can be shifted load-free in the background. The synchronization of the first planetary gear set PG1 can occur using an active speed regulation with the internal combustion engine VM, or with existing friction engaged clutch K1 alternatively, with disengaged friction engaged clutch K1 by means of synchronized shift elements A, B of a first shift packet S1 implemented as a synchronizing device.

The internal combustion engine VM can be coupled, via a first shift element A, to the sun gear or input element 9a of the second planetary gear set PG2. The internal combustion engine VM, in the case of the engaged shift element C, can use the first gear G1, and in the case of a bridged planetary gear set PG2 in the shift position D, can use the third gear G3 as an internal combustion engine drive gear. The internal combustion engine VM is simultaneously in operative engagement with the electric machine EM. Here, the electric machine EM can be operated in boost operation, recuperation operation, or with no-load.

The internal combustion engine VM can be coupled to the ring gear or the input element 8b of the first planetary gear set PG1 by engaging the second shift element B. A second gear G2, lying between the first gear G1 and the third gear G3, for the internal combustion engine VM, results. Here, the planet carrier 8c acts as an output, the sun gear 8a is firmly braked. The second gear G2 can be used in three variants for the internal combustion engine VM. In the first variant, the shift element C is engaged. This gear is shifted via only the internal combustion engine VM. In the second variant, the second shift packet S2 is in neutral. The electric machine EM is completely decoupled from the drive. The first planetary gear set PG1 generates a second gear G2 for the internal combustion engine VM that is independent of the second planetary gear set PG2. In the third variant, the shift element D is engaged.

While the driving using the internal combustion engine VM via the first planetary gear set PG1 in the second gear G2, the second planetary gear set PG2 can be shifted, load-free, in the background. The second planetary gear set PG2 can be synchronized by an active rotational speed regulation using the electric machine EM.

The optional second electric machine EM2 can be used as a starter for the internal combustion engine VM, and as a generator driven by the internal combustion engine VM for supplying the first electric machine EM for a serial driving operation in the low speed range below the first gear G1.

Figure 2:
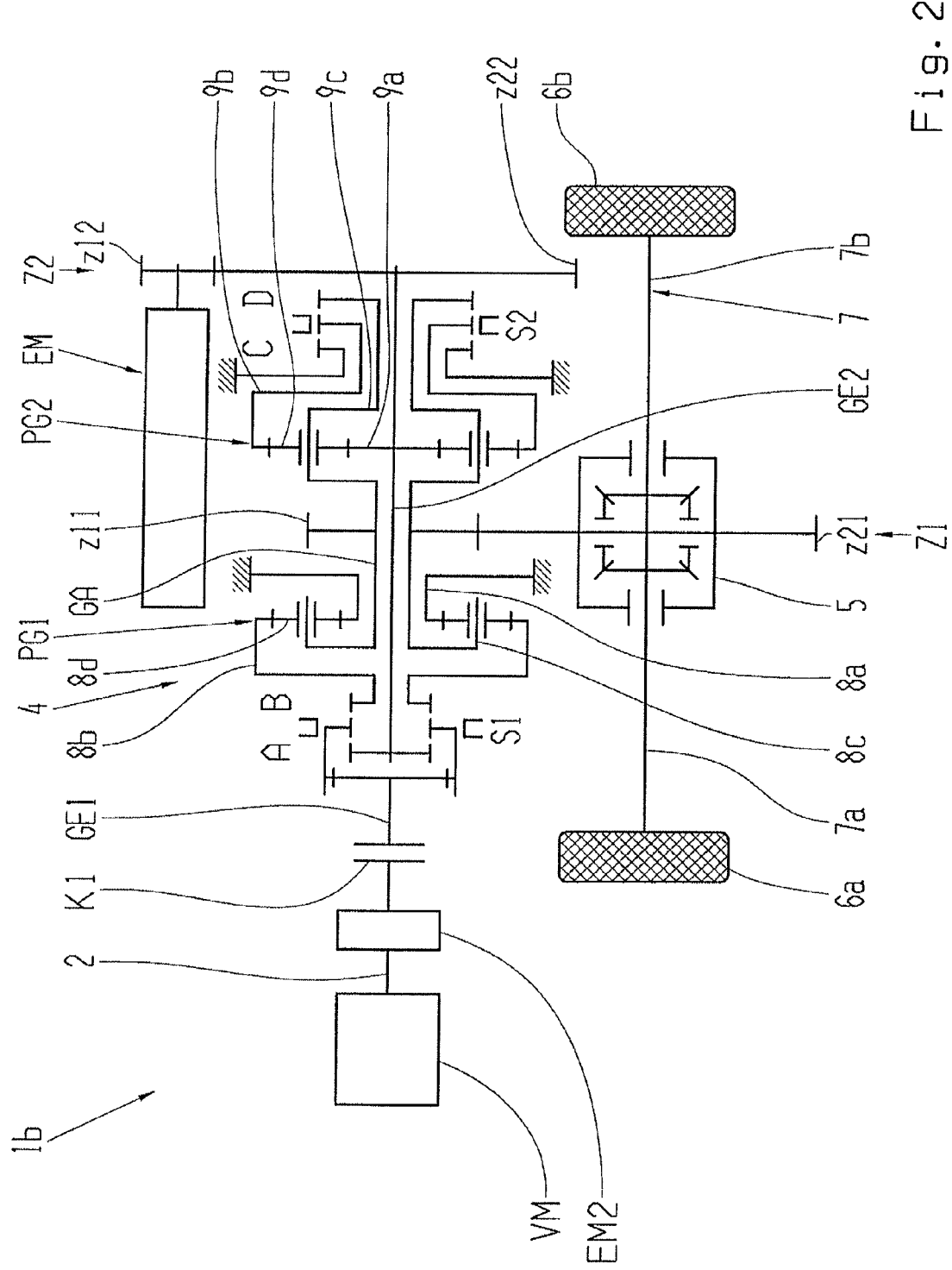

FIG. 2 shows a hybrid drive 1b with which the electric machine EM is connected laterally to the drive train via an input gear set Z2 designed as a spur gear pair. The input gear set Z2 consists of a drive gear z12, driven by the electric machine EM, that is in engagement with an output gear z22 which is disposed rotationally fixed on the second input shaft GE2. The input gear set Z2 provides a constant input transmission ratio to the electric machine EM. Apart from that, the hybrid drive 1b has an design and function equivalent to that of the hybrid drive 1a shown in FIG. 1.

Figure 3:
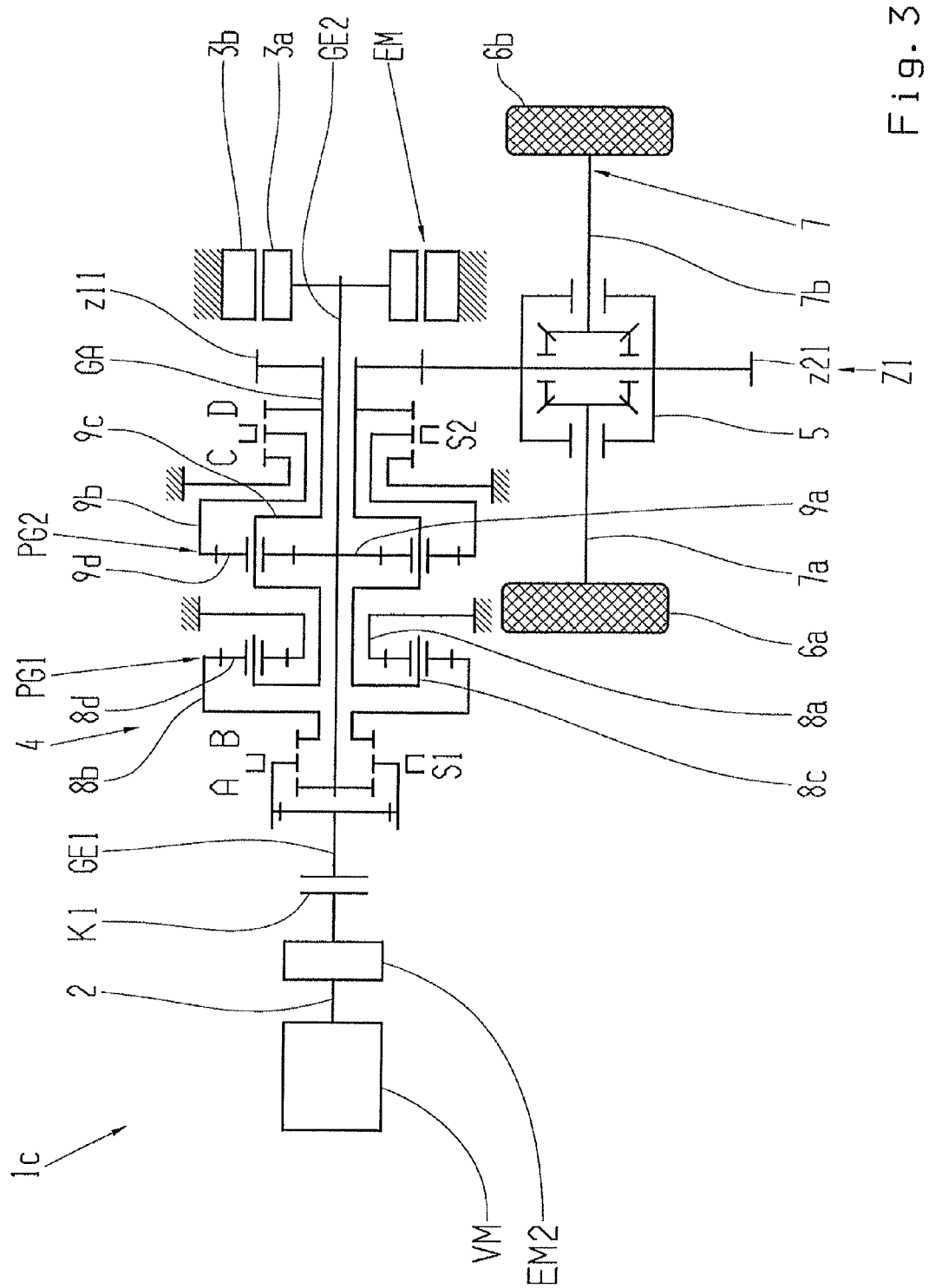

FIG. 3 shows a hybrid drive 1c, with which the output gear set Z1 is disposed laterally displaced in the direction toward the electric machine EM, whereby the output gear shaft GA is extended rearward via the planet gear carrier 9c of the second planetary gear set PG2. The two planetary gear sets PG1, PG2 are therefore moved axially closer together.

Figure 4:
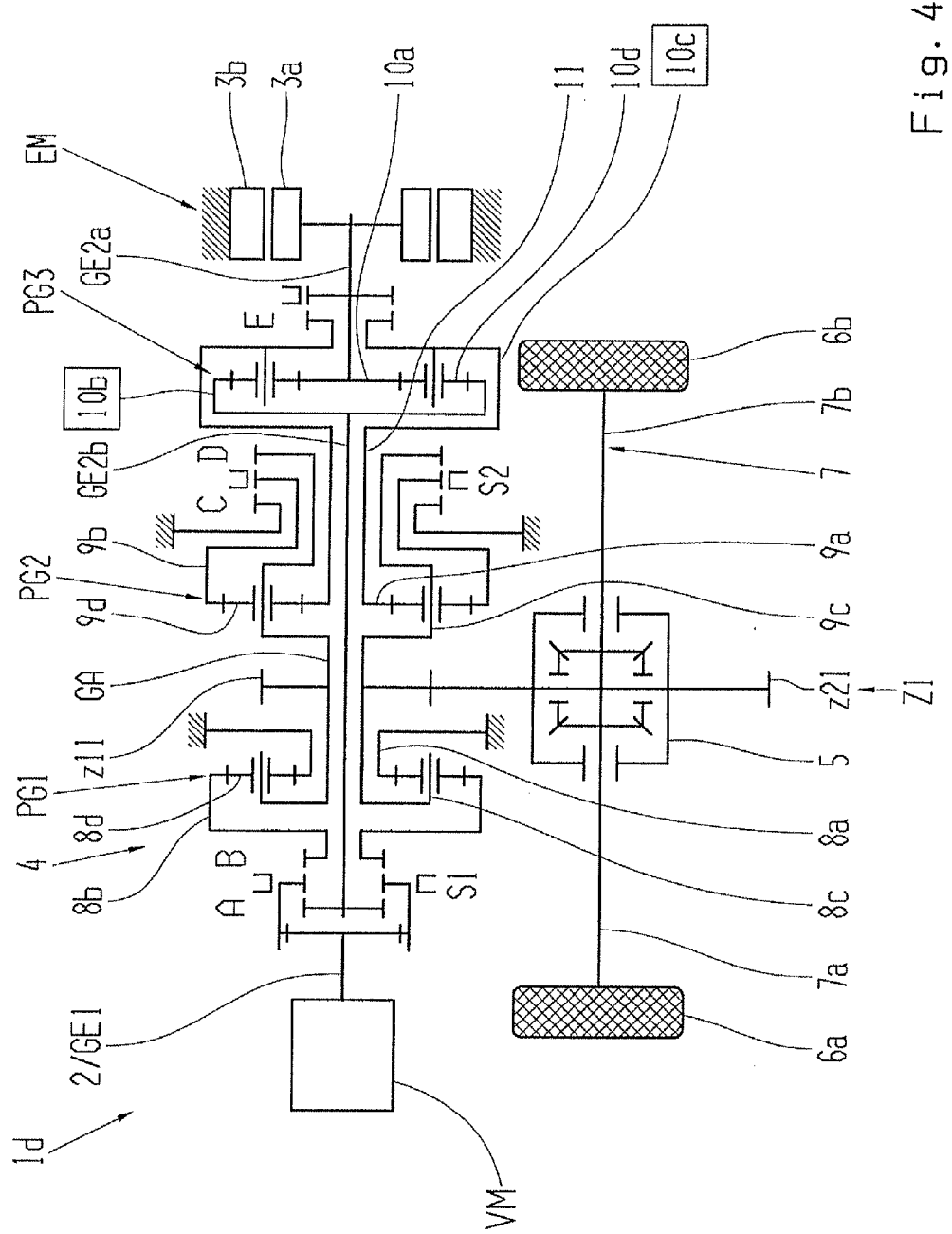

FIG. 4 shows a further hybrid drive 1d, with which a third planetary gear set PG3, which acts as an electrodynamic startup element, is disposed far from the internal combustion engine VM. It comprises a sun gear 10a, which is connected in a rotationally fixed manner to an outer shaft section GE2a of the second input shaft, a ring gear 10b, which is connected in a rotationally fixed manner to an inner shaft section GE2b of the second input shaft, and a planet carrier 10c, which is connected in a rotationally fixed manner to the input element, or sun gear 9a, of the second planetary gear set PG2, via a hollow shaft 11, and a plurality of planet gears 10d, guided by the planet carrier 10c, and in engagement with the sun gear 10a and the ring gear 10b. A fifth shift element E is also disposed on the axially outer shaft section GE2a of the second input shaft, and by means of this shift element the planet carrier 10c can be coupled to the outer shaft section GE2a, and thus with the sun gear 10a, whereby the planetary gear set PG3 can be blocked or bridged.

With the shift element E engaged, the planetary gear set PG3 is bridged, and thus not functioning. In contrast, with the shift element E disengaged, the transmission ratio of the third planetary gear set PG3 is effective, for example i0_PG2=−2. This transmission ratio can be used by a superpositioned operation of the internal combustion engine VM and the electric machine EM, wherein the electric machine EM operates, at least initially, as a generator, for wear-free start-up in the first gear G1, wherein the appropriate shift elements A and C are engaged. This function corresponds to an electric start-up element, as described in the initially cited document DE 199 34 696 A1. The friction engaged clutch K1 and the second electric machine EM2 are omitted with the hybrid drive 1d as seen according to FIG. 4.

Figure 5:
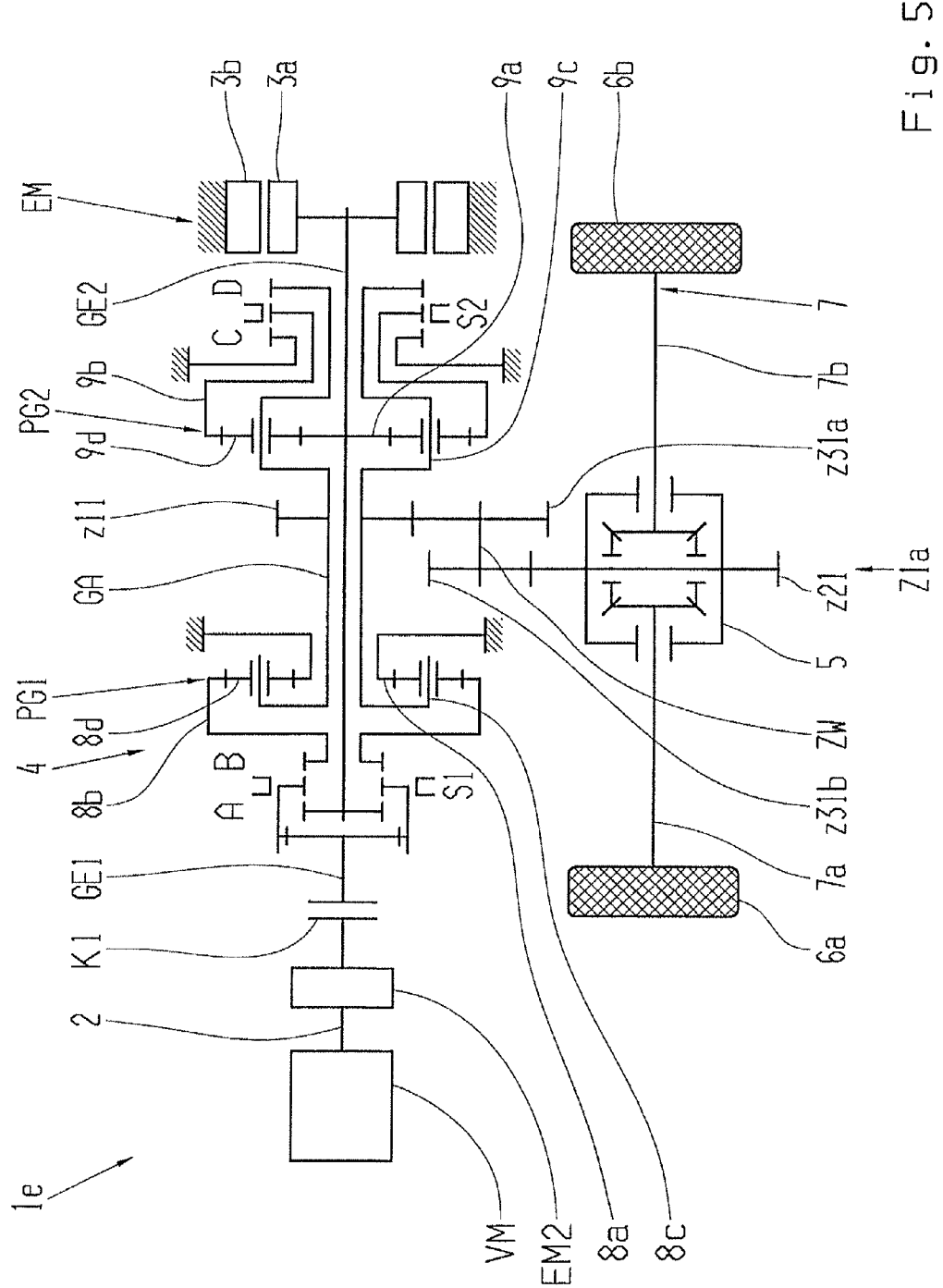

Finally, FIG. 5 shows a hybrid drive 1e, with which a two-stage output gear set Z1a is provided. The output gear set Z1a additionally has an intermediate shaft ZW, on which an intermediate gear z31a/z31b is disposed. The intermediate gear z31a/z31b is implemented as a double gear. It comprises a first gear z31a, which is in engagement with the drive gear z11, and a second gear z31b, which is in engagement with the output gear z21. A reversal of the direction of rotation of the drive train to the output can be implemented by means of the intermediate gear z31.

REFERENCE LIST 1a hybrid drive
1b hybrid drive
1c hybrid drive
1d hybrid drive
1e hybrid drive
2 drive shaft of the internal combustion engine
3a rotor of the electric machine
3b stator of the electric machine
4 manual transmission
5 axle differential
6a, 6b vehicle wheel
7 vehicle axle
7a, 7b axle shaft
8a sun gear of the first planetary gear set
8b input element, ring gear of the first planetary gear set
8c output element, planet carrier of the first planetary gear set
8d planet gear of the first planetary gear set
9a input element, sun gear of the second planetary gear set
9b ring gear of the second planetary gear set
9c output element, planet carrier of the second planetary gear set
9d planet gear of the second planetary gear set
10a input element, sun gear of the third planetary gear set
10b ring gear of the third planetary gear set
10c output element, planet carrier of the third planetary gear set
10d planet gear of the third planetary gear set
11 hollow shaft
A first shift element
B second shift element
C third shift element
D fourth shift element
E fifth shift element
EM electric machine
EM2 second electric machine
GA output shaft
GE1 first input shaft
GE2 second input shaft
GE2a outer shaft section of the second input shaft
GE2b inner shaft section of the second input shaft
K1 friction engaged clutch
PG1 first planetary gear set
PG2 second planetary gear set
PG3 third planetary gear set
S1 shift packet
S2 shift packet
VM internal combustion engine
Z1, Z1a output gear set
Z2 input gear set
ZW intermediate shaft
i_VM drive transmission ratio of the internal combustion engine
i_EM drive transmission ratio of the electric machine
z11 drive gear of Z1
z21 output gear of Z1
z31a first intermediate gear of Z1a
z31b second intermediate gear of Z1a
z12 drive gear of Z2
z22 output gear of Z2

The invention claimed is:

1. A hybrid drive of a motor vehicle comprising:
an internal combustion engine (VM) having a drive shaft (2),
at least one electric machine (EM) having a rotor (3a),
a manual transmission (4) having first and second input shafts (GE1, GE2) and a common output shaft (GA),
the first input shaft (GE1) being connectable to the drive shaft (2) of the internal combustion engine (VM) and the second input shaft (GE2) being drivingly connected to the rotor (3a) of the electric machine (EM),
the first and the second input shafts (GE1, GE2) being coaxially disposed one behind the other,
the output shaft (GA) coaxially surrounding one of the first and the second input shafts (GE1, GE2),
at least first and second planetary gear sets (PG1, PG2) being disposed coaxially behind one another,
each of the first and the second planetary gear sets having at least one input element (8b, 9a) and one output element (8c, 9c),
the internal combustion engine (VM) being alternately connectable, via a first shift element (A), to the second input shaft (GE2) or, via a second shift element (B), to the input element (8b) of the first planetary gear set (PG1), and
the output elements (8c, 9c) of the first and the second planetary gear sets (PG1, PG2) being connected to the output shaft (GA).

2. The hybrid drive according to claim 1, wherein the first and the second planetary gear sets (PG1, PG2) and the output shaft (GA) surround the second input shaft (GE2), the first planetary gear set (PG1) comprises a ring gear (8b) as the input element of the first planetary gear set (PG1), a fixed sun gear (8a), and a planet carrier (8c) as the output element of the first planetary gear set (PG1), and the planet carrier of the first planetary gear set supports a plurality of planet gears (8d) that mesh with the sun gear (8a) and the ring gear (8b) of the first planetary gear set, the second planetary gear set (PG2) comprises a sun gear (9a) as the input element of the secondary gear set (PG2), a ring gear (9b) that is fixable via a third shift element (C), and a planet carrier (9c) as the output element of the second planetary gear set (PG2), and the planet carrier of the second planetary gear set supports a plurality of planetary gears (9d) that mesh with the sun gear (9a) and the ring gear (9b) of the second planetary gear set, and a fourth shift element (D) facilitates blocking of the second planetary gear set (PG2).

3. The hybrid drive according to claim 1, wherein the first and the second planetary gear sets (PG1, PG2) have the same transmission ratio.

4. The hybrid drive according to claim 1, wherein the output shaft (GA) is drivingly connected, via an output gear set (Z1, Z1a), to an axle differential (5) of a vehicle axle (7), the output gear is positioned one of axially between the first and the second planetary gear sets (PG1, PG2) or axially in front of the first and the second planetary gear sets (PG1, PG2) or behind the first and the second planetary gear sets (PG1, PG2).

5. The hybrid drive according to claim 4, wherein the output gear set (Z1a) is a two-stage output and has a drive gear (z11) which is connected, in a rotationally fixed manner, to the output shaft (GA), and an output gear (z21) which is in drivingly connected to the axle differential (5), and an intermediate gear that is mounted on an intermediate shaft (ZW), the intermediate gear is one of a single gear or a double gear (z31a, z31b) and is in engagement with the drive gear (z11) and the output gear (z21).

6. The hybrid drive according to claim 2, wherein the first and the second shift elements (A, B) are combined with one another as a double-sided, actuatable shift packet (S1), and the third and the fourth shift elements (C, D) are combined with one another as another double-sided, actuatable shift packet (S2).

7. The hybrid drive according to claim 1, wherein the rotor of the electric machine (EM) is in drive connection with the second input shaft (GE2), via an input gear set (Z2), and the input gear set is a spur gear transmission ratio.

8. The hybrid drive according to claim 1, wherein the first input shaft (GE1) is drivingly connectable with the drive shaft (2) of the internal combustion engine (VM) via at least one of a controllable friction engaged clutch (K1) and a second electric machine (EM2).

9. The hybrid drive according to claim 1, wherein a third planetary gear set (PG3) is disposed between the second planetary gear set (PG2) and the electric machine (EM), the third planetary gear set (PG3) comprises a sun gear (10a) as an input element of the third planetary gear set (PG3), a ring gear (10b), and a planet carrier (10c) as an output element of the third planetary gear set (PG3), the planet carrier of the third planetary gear set (PG3) supports a plurality of planet gears (10d) that mesh with the sun gear (10a) and the ring gear (10b) of the third planetary gear set, the second input shaft (GE2) has an axially inner shaft section (GE2b) and an axially outer shaft section (GE2a), the input element (10a) of the third planetary gear set (PG3) is connected, via the outer shaft section (GE2a) of the second input shaft, to the rotor (3a) of the electric machine (EM), the ring gear (10b) of the third planetary gear set (PG3) is connected in a rotationally fixed manner, to the inner shaft section (GE2b) of the second input shaft, and the planet carrier (10c) of the third planetary gear set (PG3) is connected, in a rotationally fixed manner, to the input element (9a) of the second planetary gear set (PG2) via a hollow shaft (11), and a fifth shift element (E) facilitates blocking of the third planetary gear set (PG3).

10. The hybrid drive according to claim 1, wherein a separate starter device communicates with the internal combustion engine (VM).

11. A hybrid drive of a motor vehicle, the hybrid drive comprising:

an internal combustion engine having a drive shaft;

at least one electric machine having a rotor;

a manual transmission having first and second input shafts and a common output shaft, the first input shaft being connectable to the drive shaft of the internal combustion engine and the second input shaft being continuously connected to and driven by the rotor of the electric machine, the first and the second input shafts being coaxially aligned in series, and the output shaft being hollow and coaxially aligned with the first and the second input shafts, one of the first and the second input shafts passing through the output shaft; and first and second planetary gear sets being coaxially aligned with one another and the first and the second input shafts, each of the first planetary gear set and the second planetary gear set comprising a sun gear, a ring gear and a planetary carrier, the ring gears of the first and the second planetary gear sets are input elements, and the planetary carriers of the first and the second planetary gear sets are output elements, the internal combustion engine is connectable to either the second input shaft via a first shift element, or to the ring gear of the first planetary gear set, via a second shift element, and the planetary carriers of the first and the second planetary gear sets being continuously connected to each other and the output shaft, and the sun gear of the first planetary gear set is continuously connected to a housing.

* * * * *